United States Patent
Iwasawa et al.

(10) Patent No.: US 6,253,371 B1
(45) Date of Patent: Jun. 26, 2001

(54) METHOD FOR SUPPORTING PARALLELIZATION OF SOURCE PROGRAM

(75) Inventors: Kyoko Iwasawa, Tokyo; Takashi Kurosawa, Yokohama; Sumio Kikuchi, Machida, all of (JP)

(73) Assignees: Hitachi, Ltd., Tokyo; Hitachi Touhoku Software, Ltd., Miyagi-ken, both of (JP)

( * ) Notice: Subject to any disclaimer, the term of this patent is extended or adjusted under 35 U.S.C. 154(b) by 0 days.

(21) Appl. No.: 08/017,839

(22) Filed: Feb. 16, 1993

(30) Foreign Application Priority Data

Mar. 16, 1992 (JP) .................................................. 4-057674

(51) Int. Cl.$^7$ ...................................................... G06F 9/45
(52) U.S. Cl. ................................................ 717/6; 709/106
(58) Field of Search ......................... 364/DIG. 1, DIG. 2; 395/700; 717/5, 6, 8; 709/100, 101, 102, 104, 106

(56) References Cited

U.S. PATENT DOCUMENTS

| | | | | |
|---|---|---|---|---|
| 5,093,916 | * | 3/1992 | Karp et al. ........................... | 395/700 |
| 5,146,594 | * | 9/1992 | Iitsuka ................................ | 395/700 |
| 5,151,991 | * | 9/1992 | Iwasawa et al. .................... | 395/700 |
| 5,179,702 | * | 1/1993 | Spix et al. ........................... | 395/650 |
| 5,230,053 | * | 7/1993 | Zaiki ................................... | 395/700 |
| 5,237,691 | * | 8/1993 | Robinson et al. ................... | 395/700 |

OTHER PUBLICATIONS

Padua et al, Advanced Compiler Optimizations for Supercomputers, Communications of the ACM, 1986, pp. 1184–1201.*

Levesque, John M. "Transforming Existing Fortran Programs for Parallel Execution," 4th ISR Supercomputing Workshop—The Road to Parallel Applications, Aug. 29–31, 1990, (English).

* cited by examiner

*Primary Examiner*—Majid A. Banankhah
(74) *Attorney, Agent, or Firm*—Mattingly, Stanger & Malur, P.C.

(57) ABSTRACT

In order to generate a source program or an object code which can be executed in parallel efficiency by detecting an independent operation of a large grain size from a program which can not be analyzed by the compiler, a parallelization supporting tool inputs a result of an output of the interprocedural analyzer 120 and the source program. A program of intermediate language is produced by the parse and the program of information of common and dummy argument variables is reflected into the program of intermediate language by the interprocedural variable information read processing. After a control flow analysis and a dataflow analysis have been carried out, dependency unknown variables are extracted and parallelizability conditions are produced. Based on the result of the produced conditions, questions and answers are made with the user or a condition statement is inserted into the source program to execute the program and a decision of parallelizability is made. A source program or a parallelized object program which has been corrected in accordance with a user's request is also produced.

1 Claim, 10 Drawing Sheets

2 SOURCE PROGRAM

27 —
```
PROGRAM MAIN
COMMON /SIZE/NX,NY,NN

NN=3
NX=1000
NY=1000
READ(5,*)K

CALL SUBA(K)    ~25
CALL SUBB
CALL SUBC

END
```

28 —
```
SUBROUTINE SUBA(K)
REAL A(1000),B(1000),C(1000)
COMMON /SIZE/NX,NY,NN
J=1
DO 10 I=1,NX,NN
   A(I)=
   B(J)=A(I+1)+B(K)+ ···
   CALL SUBX(B,J)   ~26
   C(I)=NY
   J=J+1

10 CONTINUE
RETURN
END
```

29 —
```
SUBROUTINE SUBX(X,N)
COMMON /SIZE/NX,NY,NN
Q=X+ ···
NY=N/Q
RETURN
END
```

| SUBA NAME | KIND | OFFSET OF ARGUMENT SERIAL NUMBER | ONE-WORD LENGTH | TYPE | ACCESS | CONSTANT VALUE INFORMATION |
|---|---|---|---|---|---|---|
| K | DUMMY ARGUMENT | 1 | 4 | INT | USE | |
| NX | SIZE | 0 | 4 | INT | USE | CONST (1000) |
| NY | SIZE | 4 | 4 | INT | DEF, USE | CONST (1000) |
| NN | SIZE | 8 | 4 | INT | USE | CONST ( 3 ) |
| SUBX | | | | | | |
| N | | 1 | 4 | REAL | USE | |
| Y | | 2 | 4 | INT | USE | |
| NX | SIZE | 0 | 4 | INT | — | CONST (1000) |
| NY | SIZE | 4 | 4 | INT | DEF | CONST (1000) |
| NN | SIZE | 8 | 4 | INT | — | CONST ( 3 ) |

SOURCE LIST isn

```
1     SUBROUTINE  SUBA(K)                         ─┐ ～28
                                                   │
2     REAL  A(1000), B(1000), C(1000)              │
                                                   │
3     COMMON  /SIZE/NX,NY,NN                       │
      NX=1000    ～40                              │
      NY=1000    ～41                              │
      NN=3       ～42                              │
                                                   │
4     J=1                                          │
                                                   │
5     DO 10  I=1,NX,NN                             │
                                                   │
6     A(I)= ‥‥           ～46                      │
                                                   │
7     B(J)=A(I+1)+B(K)    ～45                     │
      ¥TMP1=J             ～43                     │
                                                   │
8     CALL  SUBX(B(J),¥TMP1)  ～26'                │
      NX=1000        ～43                          │
      NN=3           ～44                          │
                                                   │
11    C(I)=NY                                      │
                                                   │
12    J=J+1                                        │
                                                   │
3 10  CONTINUE                                     │
                                                   │
14    RETURN                                       │
                                                   │
15    END                                         ─┘
```

| ATTRIBUTE | KIND | NAME | isn1 | SUBSCRIPT | ACCESS | isn2 | SUBSCRIPT | ACCESS | TRANSFER DEPENDENCY/INCREMENTAL VALUE |
|---|---|---|---|---|---|---|---|---|---|
| local | ind | I | 5 | — | — | — | — | — | 3 |
| arg | ind | J | 12 | — | — | — | — | — | 1 |
| local | ary | A | 6 | — | def | 7 | I+1 | use | NOT RELEVANT |
| local | ary | B | 7 | J | def | 7 | K | use | UNKNOWN |
| local | ary | B | 7 | J | def | 8 | J | use | INDEPENDENT |
| local | ary | B | 7 | J | def | — | — | — | NOT RELEVANT |
| local | ary | C | 11 | — | def | — | — | — | UNKNOWN |
| com | var | NY | 8 | — | def | 11 | — | use | INDEPENDENT |
| com | var | NY | 8 | — | def | — | — | — | TWO TIMES (NEED TO BE CONVERTED) |

| ATTRIBUTE | KIND | NAME | isn1 | SUBSCRIPT | ACCESS | isn2 | SUBSCRIPT | ACCESS | DECISION |
|---|---|---|---|---|---|---|---|---|---|
| local | ary | B | 7 | J | def | 7 | K | use | NOT RELEVANT |

| LOOP INFORMATION | CONDITIONAL EXPRESSION |
|---|---|
| REPETITION OF ALL OF I = 1, 1000, 3 | I ≠ K |

IF (J,EQ,K) WRITE(7,*) 'B', 7, I, J, K

```
21
┌   SUBROUTINE SUBA(K)
│   REAL A(1000),B(1000),C(1000)
│   COMMON /SIZE/NX,NY,NN
│   INTEGER ¥TMP1,¥TMP2
│   NY=1000
│   NX=1000
│   NN=3
│ *PDIR   PARALLEL              ~110
│ *PDIR   PRIVATE ¥TMP          ~111
│ *PDIR   INDUCTION (I,3),(J,1) ~112
│   DO 10 I=1,NX,NN
│       A(I)=                   ~46
│       B(J)=A(I+1)+B(K)  ~45
│
│       ¥TMP1=J   ~43
│       ¥TMP2=NY  ~47
│
│       CALL SUBX'(B(J),¥TMP1,¥TMP2)  ~23"
│
│       NX=1000
│       NN=3
│       C(I)=¥TMP2  ~48
│       J=J+1
│  10 CONTINUE
│
│   RETURN
└   END

22
┌   SUBROUTINE SUBX'(X,N,¥TMP)  ~98
│   COMMON /SIZE/NX,NY,NN
│   INTEGER ¥TMP
│   Q=X+ ·····
│   ¥TMP=N/Q                    ~99
│
│   RETURN
└   END
```

FIG. 10

METHOD FOR SUPPORTING PARALLELIZATION OF SOURCE PROGRAM

BACKGROUND OF THE INVENTION

1. Field of the Invention

The present invention relates to a method for supporting parallelization of a source program, and more specifically, to a method in which can be decided whether or not a part of the source program is parallelizable and in which a result of the decision is reflected into a source program in the form of directive statements that can be compiled by a compiler.

2. Description of the Related Art

A parallelizing compiler is mounted on a memory-sharing-type parallel computer such as CRAY, CONVEX or Alliant. The compiler produces object programs that can be executed in parallel, in accordance with parallelization directive statements described by a user or when the compiler has decided that a program is parallelizable as a result of a static analysis within one procedure. A compiler for producing a parallelized object program based on an interprocedural dataflow analysis is discussed in the U.S. Pat. No. 5,146,594. As a currently available parallelizaton supporting tool, in which a program is inputted and outputted in the form of source program, there is FORGE commercialized by Pacific-Sierra Research. This tool is described in a reference document, "Transforming Existing Fortran Programs for Parallel Execution", by John M. Levesque, at the 4th ISR Supercomputing Workshop —The Road to Parallel Applications, Aug 29–31, 1990. This parallelization supporting tool displays the result of accesses to common variables and argument data in calling and called procedures in accordance with user's instructions. Although this tool has no function of analyzing dataflow of an array by taking in the relationship between definitions and use of variables accessed in the calling and called procedures, it has a function of displaying the result of accesses to the array when executing the procedures in case that it is not possible to analyze the dataflow and therefore it is not possible to decide whether or not a program can be parallelizable, i.e., parallelizability. In any case, this tool can only display the access result and has no function of deciding parallelizability from the displayed result, so that the decision of parallelizability is made by the user.

There are following problems which are common to the above-described compilers. It is not possible to analyze dataflow in procedures even in a case of taking in information outside the procedures including a program portion to be parallelized. The information outside the procedures means names and values of common or actual argument variables which are used only in a called procedure and the values of which are never updated and names, or names and values of common and dummy argument variable which are always constant when the procedure is called. This can be explained as follows with reference to FIG. 2. There is an actual argument variable J in a CALL statement 26 within a subroutine SUBA. If it is known based on the interprocedural dataflow information that the value of this variable will never be updated in a called subroutine (SUBX) 29, this variable can be analyzed as an induction variable. Thus, this variable does not take a same value within a DO 10 loop of the subroutine (SUBA) 28, so that it can be known that a definition 27 of an array (J) is executed as substitution into an element which is always different and accordingly does not prevent a parallelization. According to the above-mentioned techniques, however, it is regarded in the analysis of the loop of the subroutine SUBA that a value of the array B(J) is updated in the CALL statement 26 and it is also regarded that this value of the variable J can not be predicted and has a possibility that a same value is taken within the loop. When the substitution statement 27 of the array, B (J), sets values at the same address for plural times, since an abnormal result is obtained if the repetitions of the loop are parallelized, an impossibility of parallelization is decided by the compiler.

In the case where parallelizability is checked by the compiler, as discussed in the above-described U.S. Pat. No. 5,146,594, since control flow or dataflow is decided at the time when a user program is executed, there is generally a dependency relationship of data that can not be analyzed at the compile time even if an interprocedural analysis has been carried out. When there is the dependency relationship that can not be analyzed, there is a risk of incurring an abnormal result as a result of a parallelizaton, and therefore, the compiler produces an object program for sequential execution without parallelizing the program. Accordingly, even if a program is parallelizable if there is user's knowledge or information at the time of the execution, this program is decided as unparallelizable because it can not be analyzed. Further, since the compiler produces only object codes, the user can not know exactly what kind of program conversions have been carried out.

The FORGE has a function of displaying an access result of array variables by actually executing a program. However, since it does not have a function of deciding parallelizability of the program, the user must decide the parallelizability based on the overlap of accesses to array variables by looking at the displayed data. Particularly, when there is a large volume of displayed access data for the array variables, there is a risk that the user makes an erroneous decision, leading to a parallelization with an abnormal result.

SUMMARY OF THE INVENTION

It is an object of the present invention to provide a parallelization supporting method, in which a dataflow in a procedure is analyzed by using information outside the procedure, and a program which can not be parallelized by an analysis of a single program is parallelized if possible. When there is a dependency relationship that can not be analyzed statically, the dependency relationship is established by having questions and answers between a system and the user or executing the program to thereby judge whether or not the program is parallelizable. Thus, the user dose not need to make decision and therefore the risk of an erroneous decision can be avoided or madeless. When a parallelizable loop or a program conversion that is necessary for a parallelization has been detected, the user can know the result and this can be reflected into a source program so that the compiler can produce a parallelizable object program.

DESCRIPTION OF THE PREFERRED EMBODIMENT

An embodiment of the present invention will be explained below with reference to the attached drawings.

Figure 10:
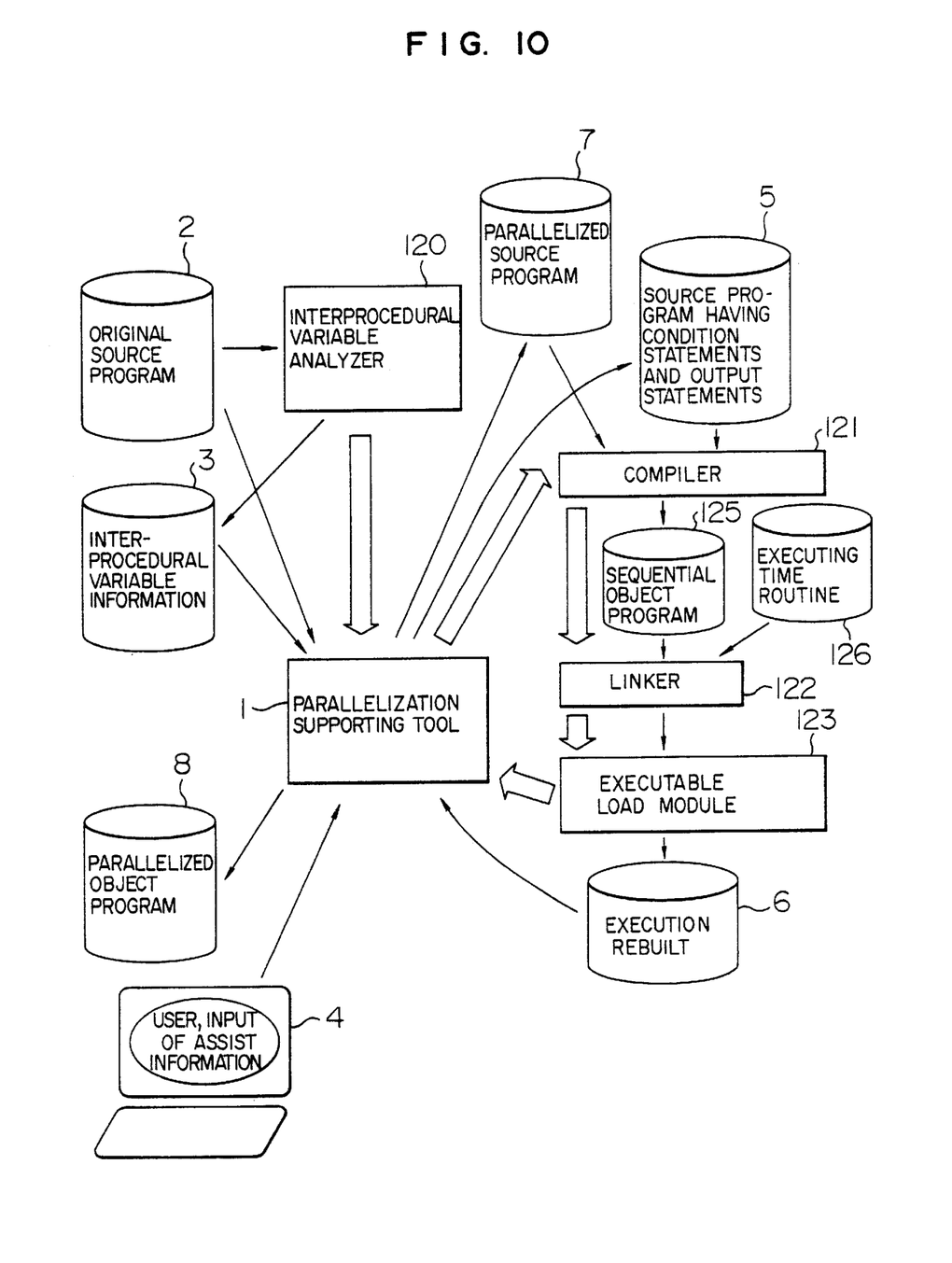
FIG. 10 is a diagram for showing the parallelization supporting tool and its surroundings.

FIG. 10 shows a parallelization supporting tool 1 according to the present invention and its environment. The processing of the present embodiment will be explained with reference to FIG. 10.

(1) At first, an interprocedural variable analyzer 120 analyzes definitions and uses of common, actual and dummy argument variables which are referred over procedures of an original FORTRAN source program 2, and outputs interprocedural variable information.

(2) The parallelization supporting tool 1 carries out a decision processing to decide parallelizability, i.e., whether or not each DO loop in the source program can be parallelized, based on this interprocedural variable information. In the present embodiment, when it is not possible to firm the parallelizability of the DO loop, a decision of parallelizability is made by use of assist information inputted by a user from a terminal 4, or made by actually executing the source program.

(3) In actually executing the source program, conditional statements for deciding whether or not the parallelizability conditions can be met and an output statement for outputting data when the conditions have been met are inserted into the source program 2, to thereby produce a source program 5. A compiler 121 is called and a sequential execution object program 125 is produced. A linker 122 links the object program 125 and execution routines 126 into an executable load module 123 which is then executed. The parallelization supporting tool 1 reads a result of the execution 6 as assist information and decides whether or not parallelization of a DO loop of the program is possible. When it is decided to be parallelizable, based on any one of these two types of assist information, either a parallelized object program is produced in accordance with user's instructions from the terminal 4 or a parallelized source program 7 is produced into which program statements are inserted showing that the compiler can produce the parallelized object program without an analysis.

The processing of FIG. 10 will be explained in further detail by taking a source program shown in FIG. 2 as an example with reference to FIGS. 1 through 9. FIG. 2 shows one example of the FORTRAN source program 2. This program includes a main program 27 and two subroutines SUBA 28 and SUBX 29.

Figure 1:
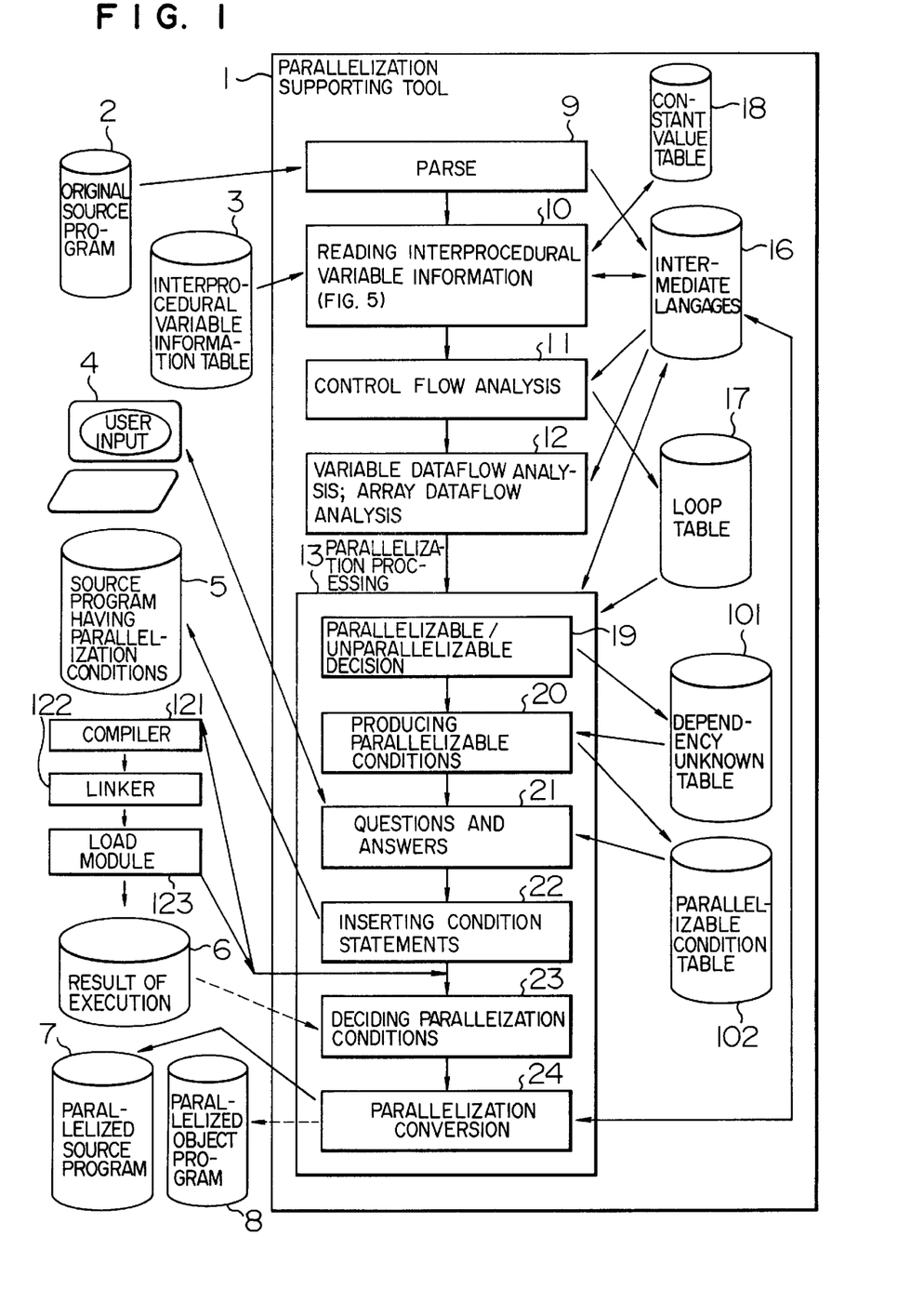
FIG. 1 is a diagram for showing the whole of the parallelization supporting tool according to one embodiment of the present invention.
Figure 2:
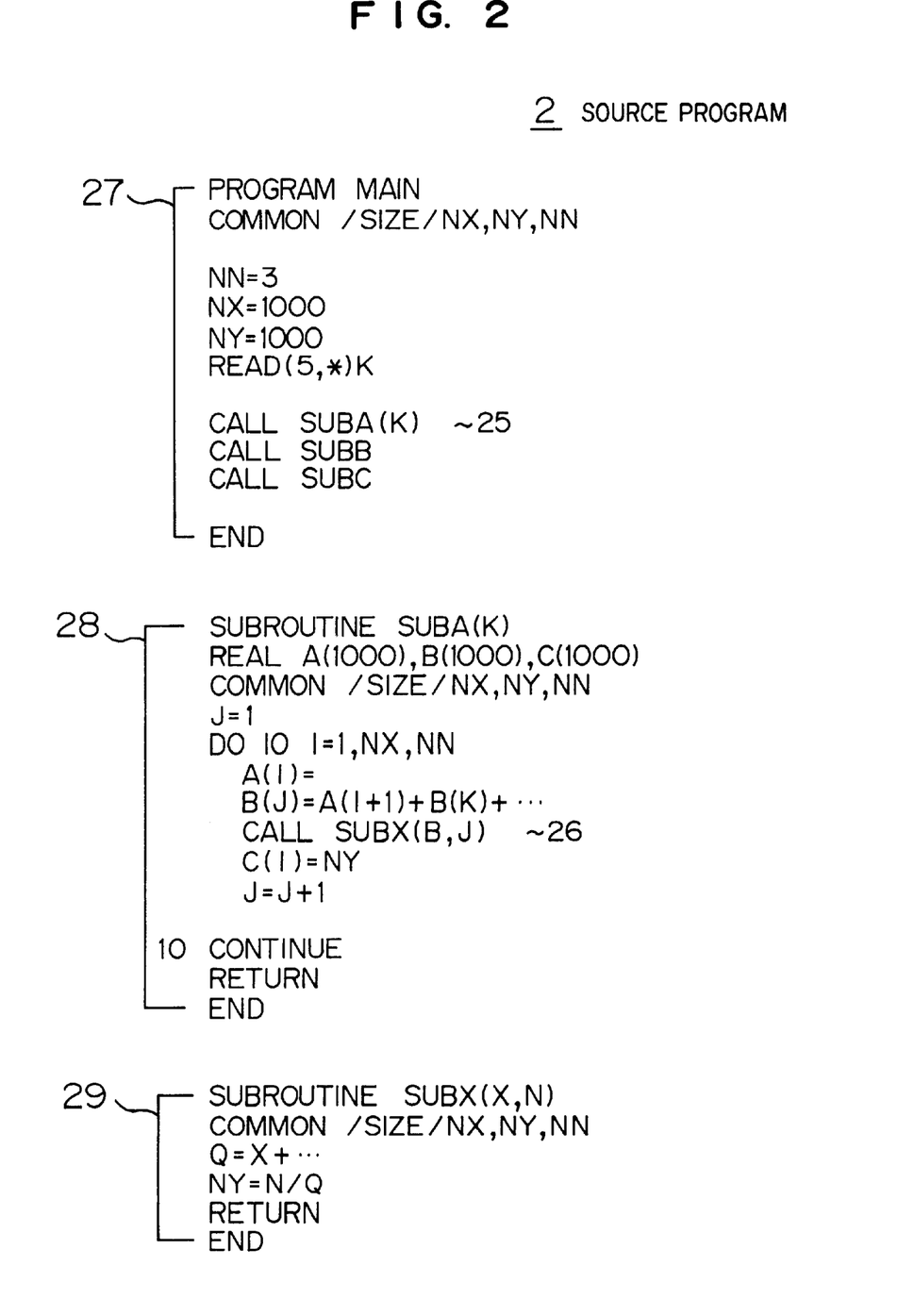
FIG. 2 is a diagram for showing an example of the FORTRAN source program.
Figure 3:
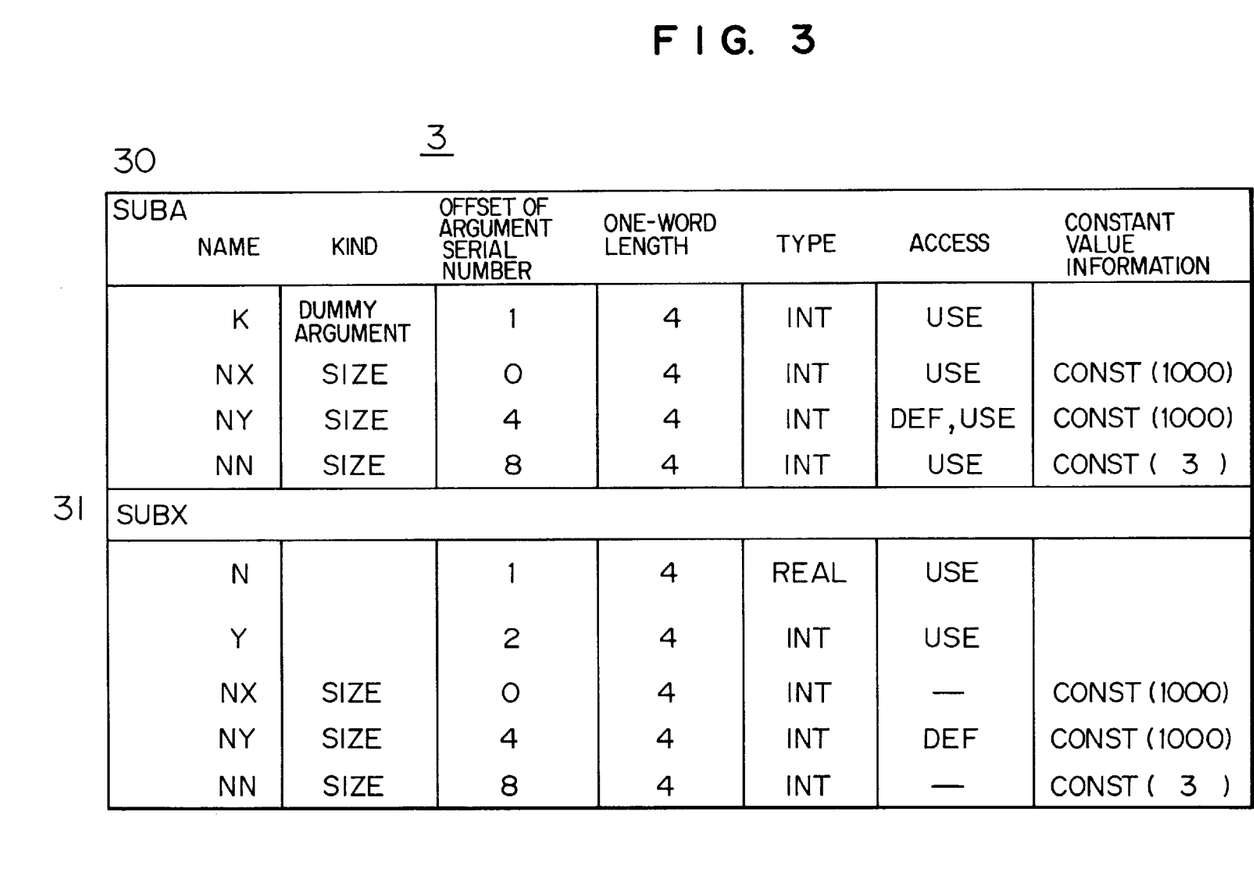
FIG. 3 is a diagram for showing an interprocedural variable information table.

At Step 9 in FIG. 1, words and syntax of the source program 2 are analyzed to produce a program of intermediate language 16, in the same manner as in a compiler. An interprocedural variable analyzer 120 executes a dataflow analysis for interprocedural variables of the source program and obtains interprocedural variable information including presence or absence of use or definition (USE, DEF), types (integers, real numbers, logical values, complex numbers) and length of one word (2, 4, 8, or 16 bytes) of interprocedural common, dummy and actual argument variables, and stores the result in a table 3. The analyzer 120 is described in the U.S. Pat. No. 5,146,594. From the source program shown in FIG. 2, interprocedural variable information as shown in FIG. 3 is obtained for the subroutines SUMA and SUBX respectively.

At Step 10 in FIG. 1, a result of the analysis by the analyzer 120, i.e., the interprocedural variable information, and constant value information from a table 18 are taken in as information outside the procedure. In other words, if there are common and dummy argument variables which always have constant values when the procedure is executed, a statement for substituting the constant values into these variables is inserted into the head of the procedure in the form of an intermediate language. If there are common or actual argument variables of which values are not changed in a called procedure by a call statement, a program of intermediate language is converted such that temporal variables are newly defined, that a statement for substituting values of the original variables into the temporal variables is inserted immediately before the call statement, and that the actual argument variables are substituted with the new variable. As a result, it becomes possible to preserve or recover data.

Figure 4:
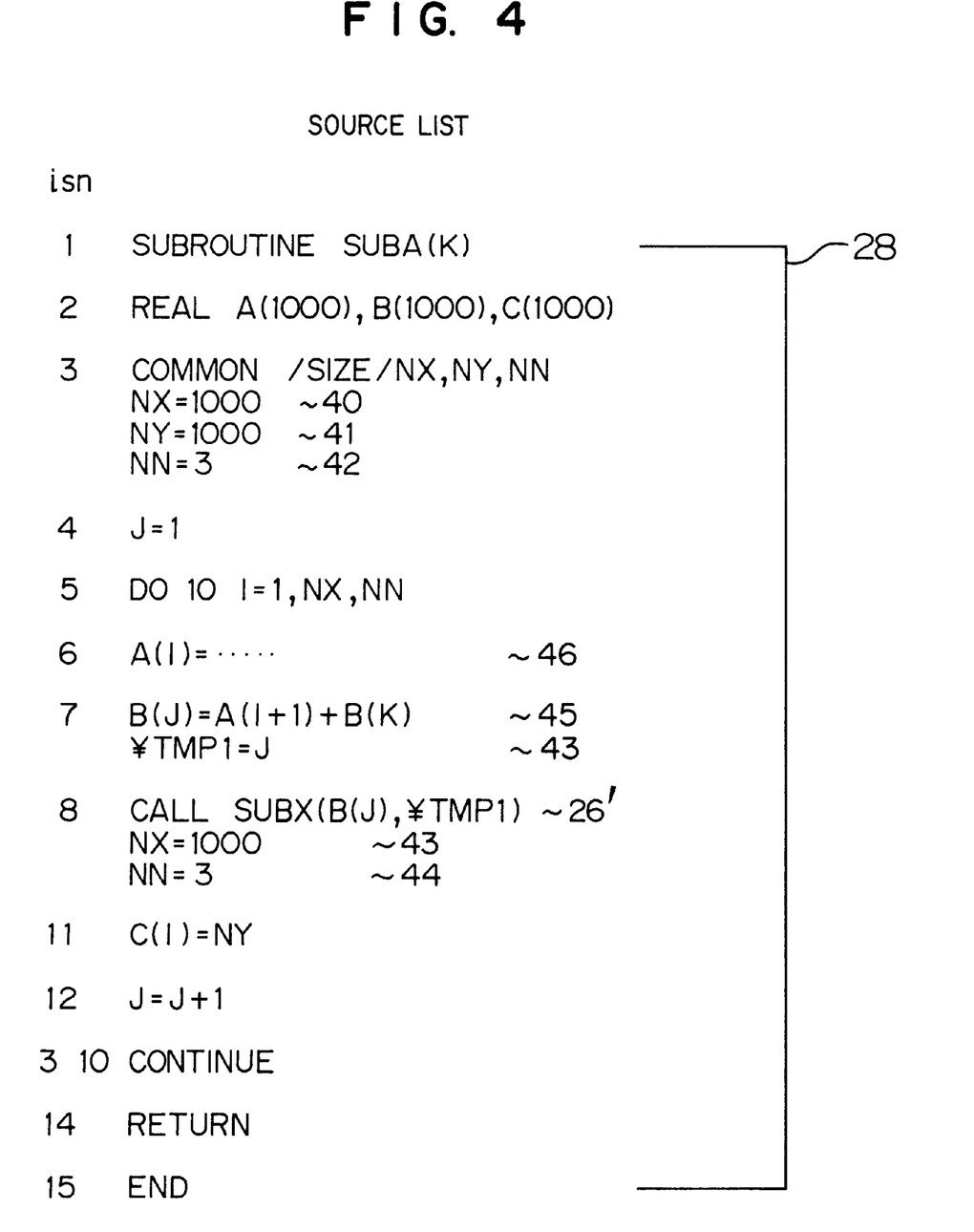
FIG. 4 is a diagram for showing a result of a program of intermediate language after taking in the interprocedural variable information shown in FIG. 1.
Figure 5:
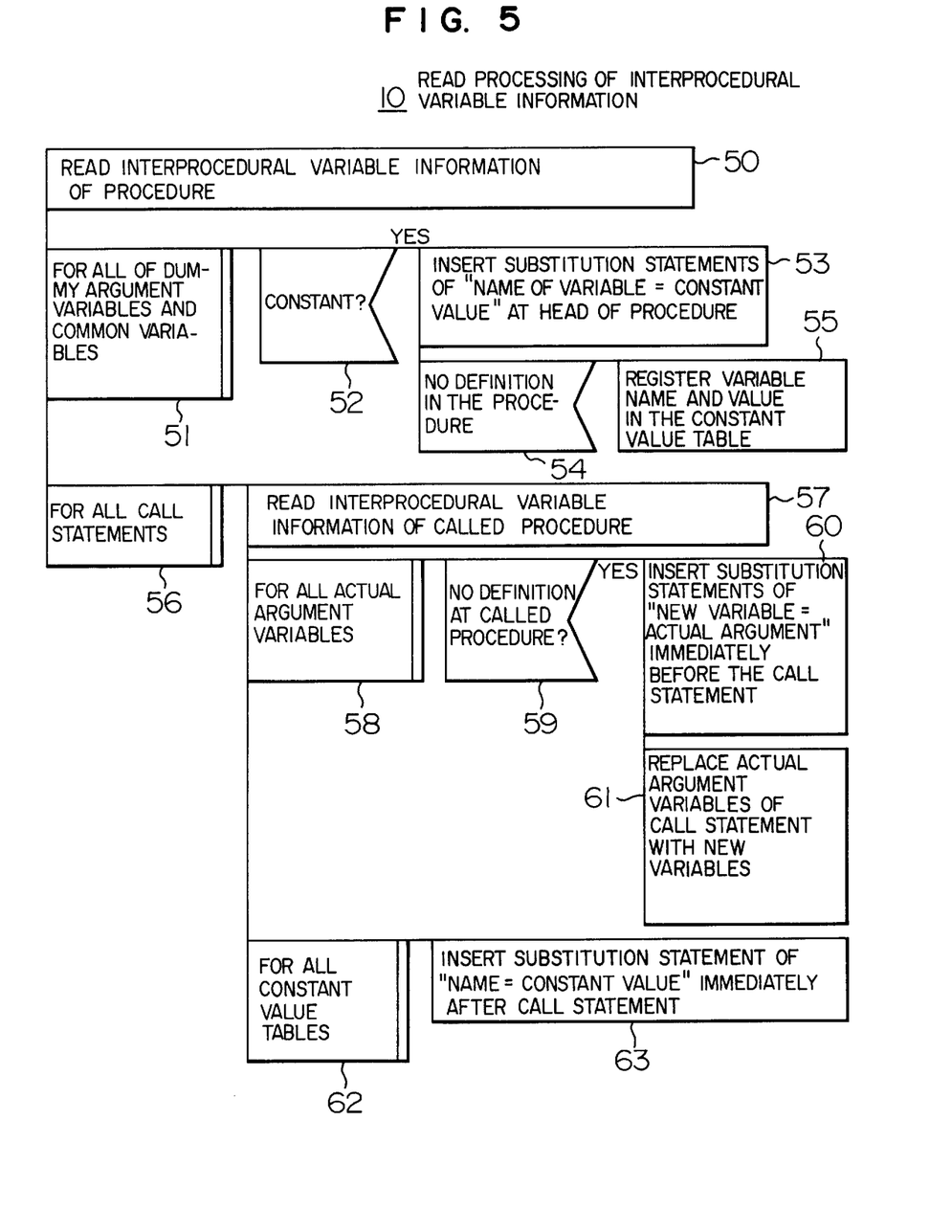
FIG. 5 is a flowchart for showing the processing procedure of taking in the interprocedural variable information shown in FIG. 1.

In a case of the source program shown in FIG. 2, the above processing is performed with an algorithm as shown in FIG. 5 and a program of intermediate language 16 corresponding to FIG. 2 is converted into a program of intermediate language for expressing the information shown in FIG. 4. Parallelizable or unparallelizable conditions of a DO loop 10 of the subroutine SUBA 28 will be considered next. Referring to FIG. 5, at Step 50, interprocedural variable information (a table 30 in FIG. 3 in this example) is read for a dummy argument variable K and all the common variables, SIZE, NX and NN, of the procedure (the subroutine SUBA 28 in this example) including the loop to be parallelized (the DO 10 loop in FIG. 2 in this example). At Step 52, a decision is made on whether there are those variables among these variables which always become constant when the procedure is called. If there are variables that become constant (for example, NX, NY and NN in information 30 in FIG. 3), a substitution statement of "the name of a variable=a constant value" is produced and inserted for each of these variables in the intermediate language and this is inserted into the head portion or the header of the executable statement of the procedure at Step 55. For example, since it is seen from the information 30 in FIG. 3 that the common variables NX, NY and NN always become constant, substitution statements 40, 41 and 42 shown in FIG. 3 are produced for these variables and are inserted into the head portion of the subroutine SUBA. When it is known from the interprocedural variable information (for example, 30) by the decision of Step 54 that these variables will not be defined in the procedure, these variables are registered in the constant value table 18 in FIG. 1 at Step 55. In the above example, since it is known from the information 30 in FIG. 3 that the variables NX and NN are used only, these variables are registered in the constant value table 18.

Then interprocedural variable information on the called procedure is read for all the call statements within the calling procedure. In the current example, the interprocedural variable information 31 in FIG. 3 of the subroutine SUBX called by the call statement 26 of the SUBA is read. Of the dummy argument variables corresponding to the actual argument variables which appears in this call statement, variables which are used only in the called procedure are detected at Step 59 for decision. In the current example, there are two actual argument variables B and J in the call statement 26 and the variable J (a second actual argument variable) corresponds to a second dummy argument variable N of the subroutine SUBX. Since this variable is for use only, this J is detected. At Step 60, a temporal or provisional working variable is provided and a substitution statement "a temporal working variable=an actual argument variable having no definition in the called procedure" for substituting the actual argument variable detected at the Step 59 into the temporal working variable is inserted immediately before the call statement. At Step 61, the actual argument variable of the call statement is replaced with a newly produced variable. In the current example, a temporal working variable YTMP1 is provided, a substitution statement 43 for substituting the variable J detected at the Step 59 with the variable YTMP1 is produced and this substitution statement is inserted immediately before the call statement 26, to thereby replace the variable J of the call statement 26 with YTMP1. With the above conversion, it is possible to express that the actual argument variable is for use only, without a new additional function for the analysis of the dataflow. In the example of the source program in FIG. 2, the variable J can be recognized as an induction variable because this is not updated at the called procedure and therefore it can be analyzed in a substitution statement 45 of the array B (J) that the value of the variable J will not overlap another value thereof or be changed during the repetition of the loop. Also the value of the J is transferred correctly to the SUBX.

Next, for all the common variables registered in the constant value table 18 prepared previously, at Step 63 a substitution statement of "the name of a variable=a constant value" is produced in the form of an intermediate language and is inserted immediately after the call statement. There is often a case that variables of which values do not change until a program is completed, such as the number of repetition of a loop and the size of an array, have been declared as common variables. Although these variables are important for knowing the accessed range of an array in order to make decision of parallelizability, since they have been declared as common variables it is regarded that there is a possibility of these variable values being changed within a called procedure, thus becoming a factor because of which it cannot be analized by the dataflow analysis whether or not parallelization can be performed. In order to prevent this, a substitution statement as described above is inserted. In the current example, the substitution statements 43 and 44 for the variables NX and NN that have been registered in the constant value table are prepared and inserted immediately after the call statement. A program of intermediate language as shown in FIG. 4 is produced in the manner as described above.

Referring back to FIG. 1, at Step 11 a control flow analysis 11 which is carried out by a normal compiler is executed for the program of intermediate language to which the interprocedural variable information is reflected and a basic block and a loop are detected to produce a loop table 17 which shows structures of the DO loops.

At Step 12, a variable dataflow analysis and an analysis of an array dataflow 12 are carried out for each DO loop while carrying out constant value propagation and a copy propagation to the program of intermediate language 16 shown in FIG. 4 to which the interprocedural variable information has been reflected. In this case, since the program of intermediate language as shown in FIG. 4 has already been obtained, it is possible to recognize that the variable NX of the DO 10 is 1000 and the variable NN is 3. Since a incremental value for the variable NN is 3, it is known that there is no data dependency relationship between a definition statement 46 and use statement 45 of an array A which is accessed in accordance with the variable I. Further, in order to show that a value of the actual argument variable J will never be replaced in the call statement 26, the actual argument variable is replaced with a temporal working variable which is different from the variable J. Accordingly, the variable J becomes an induction variable and it is known that different data is not written in the same array element by the substitution statement 45 of the variable B (J) during the execution of the DO loop 10.

At Step 13, the result of these dataflow analyses is inputted to carry out a parallelization and decision processing of parallelizability of the DO loop and the subsequent processing are carried out. In other words, in the parallelization processing 13, the decision parallelizability for each loop is made based on a predetermined decision reference condition. There is a case that a parallelizability decision can not be made just based on such an analysis. For example, if a certain loop has such a structure that a control flow or dataflow is decided at the time when the loop is executed, a data dependency relationship can not be analyzed, and therefore decision of parallelizability can not be made as a result. In this case, the name of an array variable, the positions of definition and use of the array variable in the source program 2 are extracted and they are registered in a dependency unknown table 101 corresponding to this loop.

Figure 6:
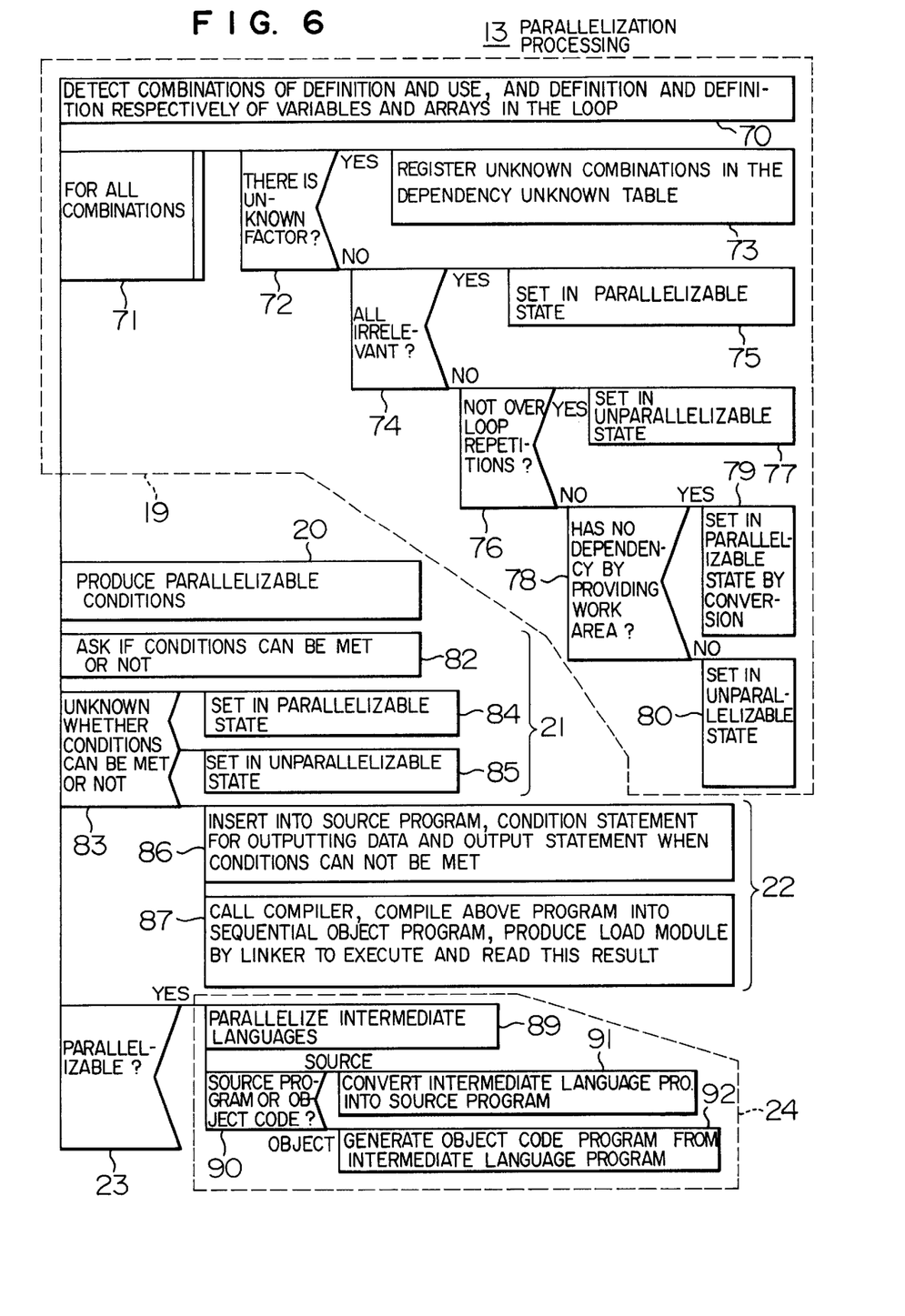
FIG. 6 is a flowchart for showing the processing procedure of a parallelizability deciding processing shown in FIG. 1.

Next, details of the parallelization processing will be explained with reference to FIG. 6. At Step 70 (Step 19 in FIG. 1), combinations of a definition and a use, and a definition and a definition are detected for variables in a loop. At Step 72 for decision, a decision is made for each of the combinations on whether or not the analysis has been made to be parallelizable, and if the analysis has not been the result is registered in the dependency unknown variable table 101. If an analysis has been made, a decision is made on whether or not the parallelizability conditions can be met. At Step 74 for decision, a decision is made on whether or not each of the combinations of a definition, and a definition and a definition, and a use overlaps at the position where an access is to be made. If there is no overlap, at Step 75 a decision is made that parallelization is possible. Next at Step 76, a decision is made on whether or not a same variable or a same array element is accessed in different loop repetitions, and if there is no such an access a decision is made that parallelization is possible. Even in a case where the same variable or the same array element is accessed in different loop repetitions, if a same area is accessed for a combination of a definition and a definition or for a combination of use and subsequent definition, parallelization may become possible when a separate work area is prepared for each of parallelized processes which are executed by processors. At Step 78, a decision is made on whether or not parallelizaton is possible when work areas are provided, and if the answer is YES, at Step 79 it is regarded that these variables or arrays are parallelizable by a conversion. If the answer is NO at the Step 78, decision is made to be unparallelizable at Step 80.

Figure 7:
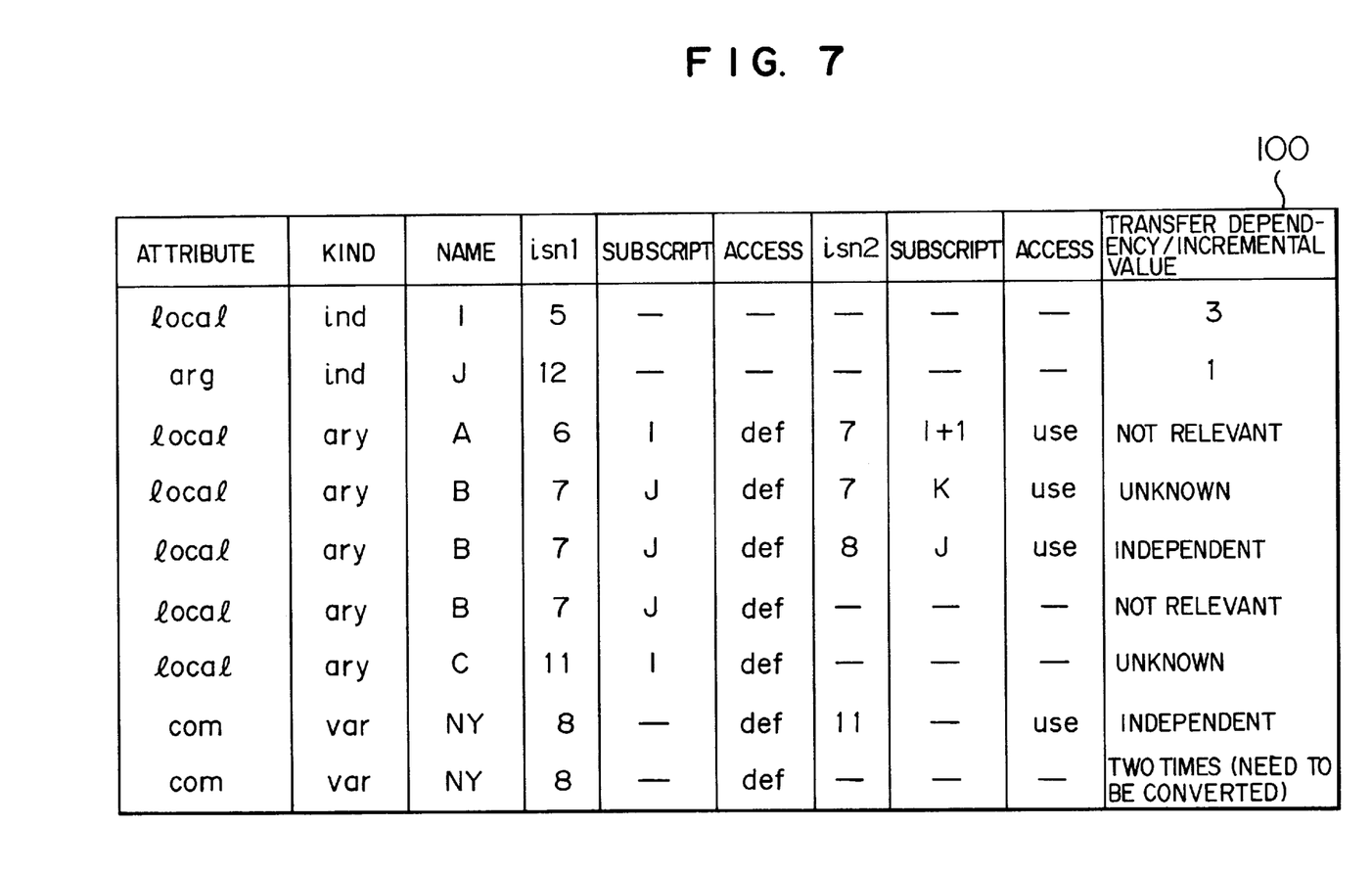
FIG. 7 is a diagram for showing the result of a data dependency analysis.
Figure 8A:
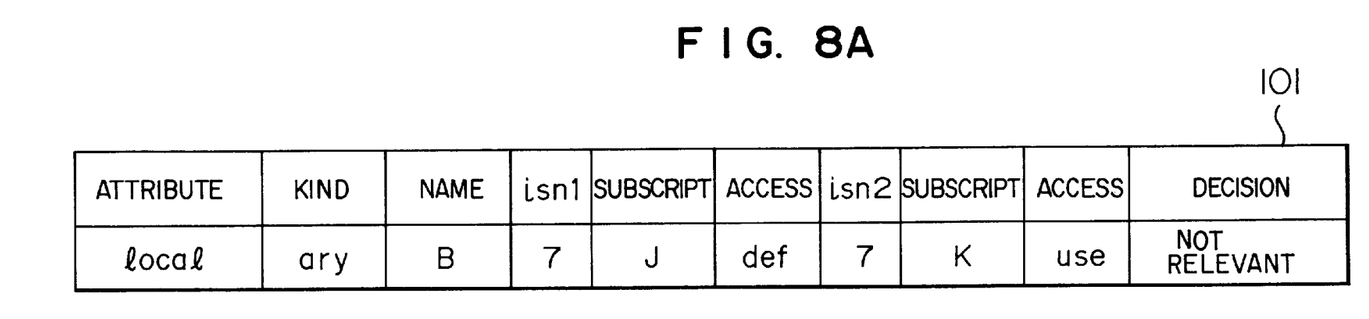
FIGS. 8A to 8C are diagrams for showing a dependency unknown table and parallelizable conditions.
Figure 8B:
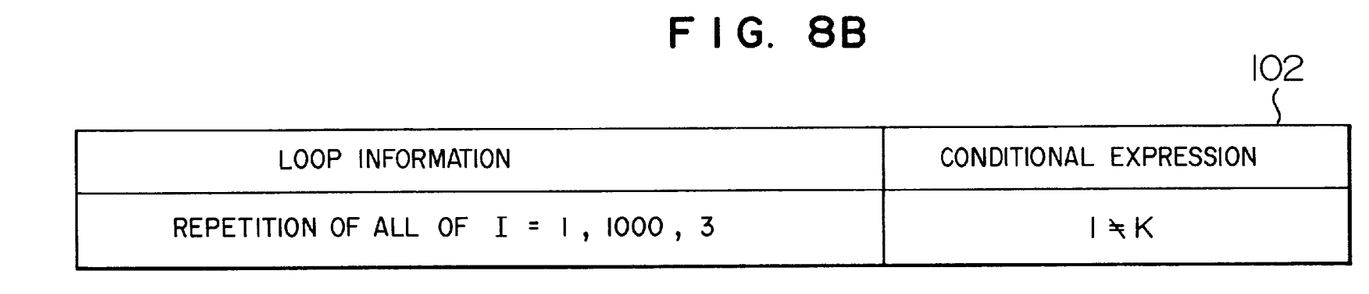

At the Step 70, based on the result of dataflow analyses of variables for the program of intermediate language shown in FIG. 4, combinations of definition and use and definition and definition for variables or arrays respectively are summarized as shown in a table 100 of FIG. 7. Referring to this table, for the arrays A and C that have no duplication in the access range, there is no data dependency relationship that prevents parallelization. The variables I and J are induction variables and therefore they are parallelizable when an incremental value and an initial value are used. The variable NY of which values are defined in different loop repetitions becomes parallelizable at the Step 78 for decision when a work area is used. When the relationship between a definition 28 and a use 27 of the array B can not be analyzed at the Step 73, they are registered in the dependency unknown variable table 101 that dependency relationship is unknown. FIG. 8A shows an example of the contents of this table 101. When the data dependency relationship can not be analyzed and there are combinations of a definition and a use and a definition and a definition of variables or arrays registered in the dependency unknown table 101, at Step 20 parallelizability conditions are produced as follows. A conditional statement that an address to be accessed does not overlap in each of the combinations of a definition and a definition, and a definition and a use of the arrays or variables or a conditional statement that a same address is not accessed in different loop repetitions is produced. A produced conditional statement is stored in a condition table 102. In the example of the dependency unknown table 101 shown in FIGS. 4 and 8A, parallelizability conditions are produced at the Step 20. Since the variable J of the array B (J) is variable for loop interations and the variable K of the array B (K) is invariable for loop interations, an access range of the array B is different. A value defined in a different repetition is necessarily used if there is duplication or overlap in the array B (J) and the array B (K). Accordingly, a parallelizability condition is met only when the J and K are not equal to each other for all the repetitions of the loop or there is no duplication in the access range. At this time a condition table 102 shown in FIG. 8B is produced.

At Step 21, a condition is inputted from this condition table 101 and whether the condition can be met or not is asked to the user through a terminal 4. At this step, when the user has responded that the parallelizability condition can be met a decision is made that the parallelization is possible. If the user has responded that the parallelizability condition can not be met a decision is made that the parallelization is not possible. This processing is carried out for each loop. In the Step 21 for questions and answers, at first at Step 82, these conditions are displayed in the terminal 4 shown in FIG. 1 and whether or not these conditions can be met is asked to the user. If the user can answer YES or NO, a decision is made at Step 83 whether or not an instruction for meeting all the conditions has been received from the user. Based on this decision, decision is made to be parallelizable or unparallelizable, at Steps 84 and 85.

Figure 8C:
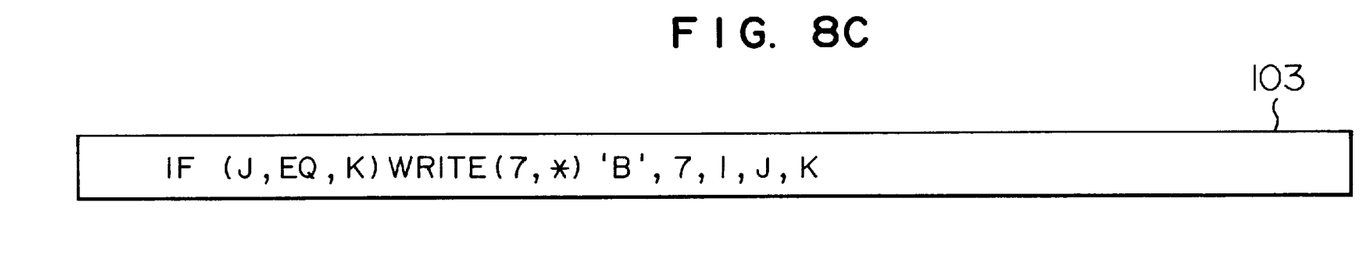

When the user can not answer whether or not any one of the loops can meet the conditions and the user has given an instruction that the user wants to confirm by executing the program whether or not the parallelization is possible, at Step 22 the source program is corrected or modified as follows and this is executed sequentially. At the Step 22, a condition statement for deciding whether or not an executable statement which dose not meet the conditions appears in the source program 2 and an output statement for outputting data when the conditions are met are inserted into the original source program 2, to thereby produce a new source program 5. The source program 5 is passed through a compiler 121 and a linker 122 to produce a load module 123 which is executed to obtain a result of the execution 6. That is, when the conditions produced at the Step 20 are not met during the execution, an executable statement for outputting detailed information of the result of execution is inserted into the source program at Step 86. In the example of the source program in FIG. 2 and the dependency unknown table 101 shown in FIGS. 4 and 8A, when the conditions are not met at Step 86 a condition statement for representing this and an output statement 103 shown in FIG. 8C are inserted immediately before the substitution statement 45 shown in FIG. 4 for the variable B. Next at Step 87, the compiler 121 shown in FIG. 1 is called and a sequential object program 125 is produced from the source program 5 after the above-described condition statement and the output statement have been inserted, and the sequential object program 125 is linked with execution routines 126 by the linker 122 to thereby produce an executable load module 123. This load module 123 is executed and a result of the output 6 upon execution is stored.

At Step 23, the execution result 6 is read and a decision is made on whether or not the above-described parallelizability conditions have been met. When the decision has been made that the parallelizability conditions have been met, at Step 24, a decision is made that the loop is parallelizable. If there is some content in the output result 6, the loop is unparallelizable. If there is no message in the output result 6 the loop is parallelizable. By utilizing presence or absence of this output, a decision of parallelizability is made at Step 23.

In the case of a statement 103 in FIG. 8C, a file 6 corresponding to a device number 7 is read. If data has been outputted to this file 6 a decision is made that the loop is unparallelizable and if no data has been outputted a decision is made that the loop is parallelizable.

After parallelizability has been decided at the Steps 19, 21 and 23, next at Step 24 one of the following two kinds of processing is selected in accordance with user's instructions sent from the terminal 4. In one of the two kinds of processing, a statement for instructing a parallelization of a loop to the compiler is inserted into the original source program 2 so that the loop that has been decided to be parallelizable at the Step 21 or 23, can be parallelized later by the compiler, together with the loop that has been decided to be parallelizable at the Step 19, to thereby produce a new source program 7. In the other kind of processing, a parallelization conversion is carried out for the loops that have been decided to be parallelizable at the Step 19, 21 or 23, within the program of intermediate language 16 and then storage allocation, register allocation 12 and code generation 15 are carried out in the same manner as the normal compile processing, to thereby produce a parallelized object code 8. The purpose of the above processing is for the user to obtain the parallelized object program and hence to avoid an unnecessary procedure that the program of intermediate language which has already been obtained by the supporting tool is converted into the FORTRAN program 7 and this is then again converted into an object program via a program of intermediate language by the compiler 121. However, in a case that the user has read the source program 7 after the parallelization and it is still necessary to change the program, it is unavoidable to output the FORTRAN source program 7.

As described above, when it is possible to parallelize any one of the loops within the source program at the decision Steps 19, 21 and 24, the parallelization conversion is carried out as follows. First, at Step 89, parallelization is performed for the program of intermediate language 16. Then, at Step 90, a question is made to the user whether the user wants a source program or an object code program as an output. Depending on a response to this question, the program of intermediate language 16 is converted into a source program which is then outputted at Step 91 or the intermediate language 16 is converted into an object code program which is outputted at Step 92.

Figure 9:
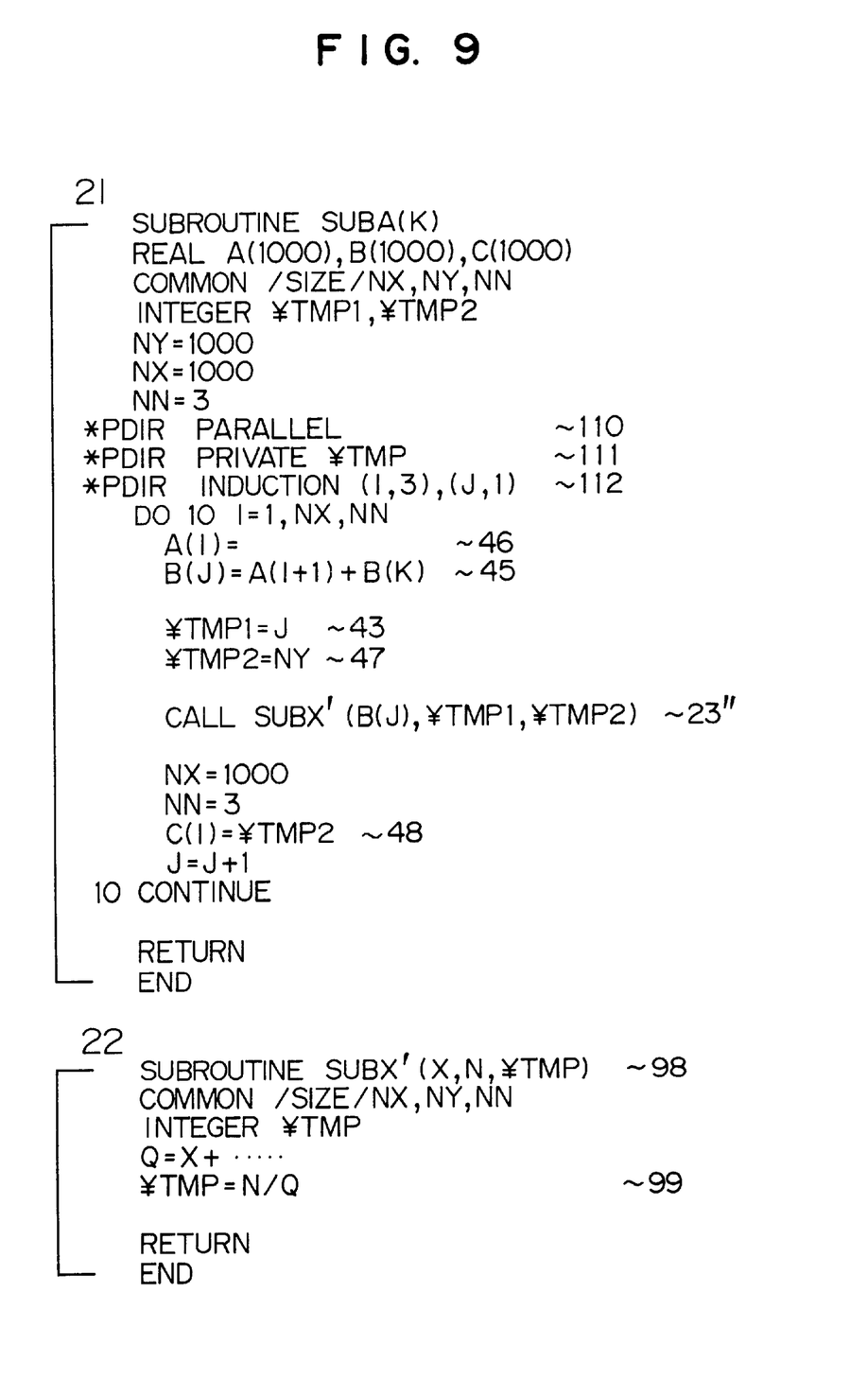
FIG. 9 is a diagram for showing a source program after parallelization of the program shown in FIG. 2.

In the examples of FIGS. 2 and 4, the array B (J) and the array B (K) are irrelevant and when a decision has been made at the Step 23 that parallelization is possible, the parallelization conversion at the Step 91 becomes as follows. Based on the table 100 in FIG. 7, through decision Steps 74, 76 and 78, the common variable NY is parallelizable by providing a work area of each processor. In order to convert the variable so that the work area can be used, the interprocedural common variable needs to be changed in an argument transfer manner. At first, a new variable YTMP2 is produced and a substitution statement 47 for substituting the value of the common variable into the new variable is produced and then inserted immediately before the CALL statement. A new variable YTMP2 is added to the actual argument variable of the CALL statement and the use of the variable NY is replaced with the use of the variable YTMP2 to obtain a statement 48. It is declared by a directive statement 111 that this YTMP2 is to be used as the work area. In this case, the called subroutine also needs to be converted in correspondence to this change. If the SUBX has also been called elsewhere, a subroutine SUBX' is newly produced and the variable YTMP is added to the dummy argument variable to obtain a statement 98. The definition and the use of the variable NY in the executable statement are replaced with the variable YTMP to obtain a statement 99. If the common variable has been converted in an argument transfer manner, the work area is defined in the calling procedure and the addresses of the area are transferred to the called procedure, so that a value can be written into a different address without the contention of the subroutine SUBX to be executed in parallel. Following the above processing, directive statements 110, 111 and 112 are inserted so that the program of intermediate language 16 is converted into the FORTRAN program and this can be parallelized when the source program of this FORTRAN program is compiled, to produce a parallelized program 7 as shown in FIG. 9. When the user desires an object code program, at Step 92, an executable statement of the system call necessary for the parallel processing is inserted immediately before and after the DO loop and then normal compiler processing of storage and register allocations and code generation is carried out to produce a parallelized object code program 8.

The present invention is summarized as follows.

At the Step 9 of parse shown in FIG. 1, the source program is read and the program of intermediate language 16 is produced. Next, at the Step 10 of reading the interprocedural variable information that has been produced in advance by the interprocedural variable analyzer 120 in FIG. 10, the interprocedural variable information 3 is read, only the information of the constant value information and the use of the common and actual argument variables are reflected into the program of intermediate language and the normal control flow analysis 11 and the dataflow analysis 12 are carried out. By executing the above processing, it becomes possible to read information outside procedures and it becomes also possible to identify the induction variables that have not been able to be detected by the normal compiler and the subscripts that have not been able to be analyzed by the normal compiler. The method of analysis by utilizing the interprocedural analyzer is described in U.S. Pat. No. 5,146,594. Then, at the decision Step 13 of parallelization, a decision is made by using the data dependency relation whether or not the loop is parallelizable and whether or not the loop needs to be parallelized. If the data dependency relation is such that data analysis can not be made because the value is decided at the time of execution, the following processing is carried out to firm up the data dependency relation and a decision is made on whether or not the loop is parallelizable. At the Step 19 of extracting dependency unknown, the dependency that has not been able to be analyzed is extracted, and conditions for making it possible to parallelize are produced at the Step 20 for producing parallelizability conditions. At the Step 21 of questions and answers, the conditions are displayed and the user is asked if the conditions can be met or not and the user's response is received. When the user knows the data dependency relation as described above, it is possible to take in information of the dependency relation.

In this case, if the user can not answer the question and when the user desires the data dependency relation to be firmed up, at the Step 22 of inserting the condition statement, a condition statement and an output statement are inserted into the source program for outputting detailed information when parallelizability conditions are not met. The compiler 121 shown in FIG. 10 compiles this program 5 into a sequentially executable object program 125, and the linker 122 produces the load module 123 and has it executed. The output data 6 showing the result of execution is read and the parallelizability decision is made. In this way, it is possible to firm up the dependency relation which can not be statically analyzed even if the user has not understood the data dependency relation.

Since the parallelizability decision is made by using the data dependency relation that has been firmed up as described above, it is possible to make decision that the parallelization is possible even if it is not possible for the compiler to analyze the dependency because the data dependency relation is decided at the time of execution.

When a decision has been made that the parallelization is possible, at the Step 23 for parallelization conversion, the program of intermediate language is parallelized and, if the user desires, the compiler for carrying out processing for each procedure converts the program into a source program while inserting directive statements that can produce a parallelization object code program, without carrying out a new analysis. With this arrangement, the user can read the source program that has been parallelized and apply correction or modification to this source program, and it becomes not necessary to make questions and answers or execute the program each time when the source program is changed.

When the user desires, the storage and register allocations 14 and the code generation 15 which are the functions of the conventional compiler are carried out to produce a parallelized object code program. With this arrangement, the user who dose not need to read or correct the source program can obtain the parallelized object program.

In the parallel processing, in order to have an improved execution speed, it is essential to detect a parallel execution unit of a large grain size in the source program. However, since the conventional compiler dose not carry out an interprocedural dataflow analysis, it is not possible to make a decision of parallelization when there is a CALL statement and hence the parallelization is abandoned. There are many programs which it turns out to be parallelizable if a question has been made to the user or when the program has actually been executed even if the parallelization of the loop has been abandoned because the compiler can not analyze the dataflow.

In the above cases, the use of the supporting tool of the present invention enables the user who is not so familiar with the parallel processing to change the basically parallelizable program, which the compiler has not been able to automatically parallelize, into a parallel executable object program or enables the user to produce a source program for the compiler to produce a parallelized object code program.

What is claimed is:

1. A method for supporting parallelization of a source program, comprising the steps of:

receiving data representative of a predetermined reference condition from an associated source program into a data processing device, the data Processing device including a processor unit and a data storage;

performing, in the data processing device and based on the predetermined reference condition, a first decision on whether a portion of the source program is determinable as parallelizable;

receiving, into the data processing device, assist information relating to said source program when the first decision indicates that it is not possible to decide whether or not said program portion is parallelizable;

performing, via the data processing device and based on said assist information, a second decision on whether said program portion is parallelizable; and inserting into said source program a program statement which is necessary for a compiler to generate parallelly executable object code program at such point as it becomes possible to parallelize as a result of said second decision;

wherein said step of receiving, into the data processing device, assist information comprising the steps of:

directing a user said assist information to be inputted; and receiving said assist information which has been inputted in accordance with said direction.

* * * * *